US005824393A

United States Patent [19]

Nakamura

[11] Patent Number: 5,824,393

[45] Date of Patent: Oct. 20, 1998

[54] FORGERY-PREVENTING TEXTURED EMBLEM

[75] Inventor: Shigeyuki Nakamura, Kyoto, Japan

[73] Assignee: Nakamura Label Inc., Kyoto, Japan

[21] Appl. No.: 548,833

[22] Filed: Oct. 26, 1995

[51] Int. Cl.$^{6}$ .................................................... B32B 3/00

[52] U.S. Cl. .......................... 428/195; 428/224; 428/292; 428/297; 428/357; 428/688; 428/690; 428/913

[58] Field of Search .................................... 428/195, 224, 428/292, 297, 357, 688, 690, 913

[56] References Cited

U.S. PATENT DOCUMENTS

| | | | |
|---|---|---|---|
| 4,756,557 | 7/1988 | Kaule et al. | 283/85 |
| 4,897,300 | 1/1990 | Boehm | 428/195 |

FOREIGN PATENT DOCUMENTS

| | | | |
|---|---|---|---|
| 0269542 | 6/1988 | European Pat. Off. . | |
| 0328320 | 8/1989 | European Pat. Off. . | |
| 0621574 | 10/1994 | European Pat. Off. . | |
| 3307622 A | 7/1984 | Germany | C09D 5/22 |

*Primary Examiner*—William Krynski
*Attorney, Agent, or Firm*—Birch, Stewart, Kolasch, and Birch, LLP

[57] ABSTRACT

A textured emblem (1) having an identification mark (2) such as a trademark. Said mark is made of thread having inorganic fluorescent material applied thereon which will emit light when subjected to illumination with ultraviolet radiation.

1 Claim, 1 Drawing Sheet

FORGERY-PREVENTING TEXTURED EMBLEM

FIELD OF INVENTION

The present invention relates to identification labels, such as textured emblems bearing trademarks, distributors' names, manufacturers' names or the like which may be applied to garments, etc.

BACKGROUND ART

Heretofore, the prior art has employed peculiar woven textures, special colors and/or peculiar styles of letters for the purpose of preventing forgery of articles of manufacture, such as garments.

While identification marks such as trademarks have heretofore been made in the form of textured emblems, printed names or labels, all of them can be easily forged in that if samples were given, it was possible to easily produce counterfeit articles which could not readily be distinguished from the genuine articles.

Should articles having forged trademarks or the like affixed thereon be found to be poor quality, the distributors or manufacturers would be obliged, in some instances, to accept returned goods, resulting in badly impairing the distributors' or manufacturers' credit.

For this reason, it was a common practice in the past to make emblems such as trademarks by the use of peculiar woven textures, special colors and/or peculiar styles of letters in an attempt to prevent forgery. Nevertheless, the method of manufacture could be found out by analyzing the structure and/or constituents, so that such emblems could easily be imitated and it was hard to discern forgeries.

DISCLOSURE OF THE INVENTION

Accordingly, the present invention contemplates providing a forgery-preventing identification label, comprising a textured emblem formed of a special material which makes it possible to detect any counterfeit despite any resemblance in appearance.

To this end, the present invention provides a forgery-preventing identification label, comprising a textured emblem having an identification mark such as letters, figures and/or other indicia woven or knitted thereinto, the mark being made of any type of known thread such as natural, chemical or synthetic fibers having inorganic fluorescent material applied thereon. The term "textured emblem" is intended to mean an emblem entirely (both the identification indicia and the background) woven or knitted of threads. Either one or both of the threads to be incorporated in the identification indicia and the background may be coated with inorganic fluorescent materials. That is, the fluorescent identification mark may be woven or knitted into the identification indicia, the background, or both.

The forgery-preventing identification label according to the present invention will appear to be white or of other particular color under visible light, but due to the mark such as a trademark formed of inorganic fluorescent material-coated thread being woven into the emblem, and/or background of the label, illumination of the emblem with ultraviolet radiation in the range of wavelength between about 300 nm and 400 nm, depending on the ambient lighting conditions, will immediately cause only that portion of the emblem having the mark to emit light of a particular shade inherent to the inorganic fluorescent material. It is thus to be appreciated that one glance is enough to discriminate any counterfeit made to imitate only the appearance of the real, because the counterfeit will not emit light when subjected to illumination with ultraviolet light.

In a second embodiment, the present invention relates to a method of identifying a genuine article of manufacture, comprising illuminating an identification label with ultraviolet light, the identification label comprising a textured emblem having fluorescent thread woven or knitted therein and being attached to the article of manufacture, and observing a fluorescent color of the thread.

In another embodiment, the present invention relates to a method of identifying a forged article of manufacture, comprising illuminating an identification label with ultraviolet light, the identification label comprising a textured emblem attached to the article of manufacture, and observing the absence of a particular fluorescent color incorporated in an identification label of a genuine article of manufacture.

BRIEF DESCRIPTION OF THE DRAWINGS

The construction and features of this invention will be apparent from the following description of a preferred embodiment thereof taken in conjunction with the accompanying drawing in which.

DESCRIPTION OF THE PREFERRED EMBODIMENT

Figure 1:
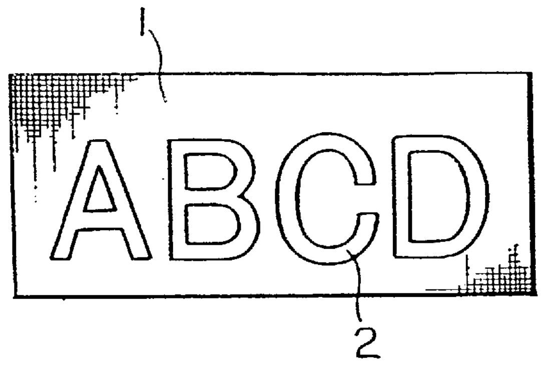
FIG. 1 is a plan view of an embodiment of the identification label according to this invention.

Referring to FIG. 1, there is shown an embodiment of the identification label and textured emblem according to the present invention. This emblem generally designated by the reference numeral 1 includes an identification mark 2 such as letters, figures and/or other indicia representing trademarks, distributors' names, manufacturers' names or the like. The mark 2 is made of thread having inorganic fluorescent material applied thereon and is woven or knitted into the emblem 1.

For the purpose of this invention, inorganic fluorescent materials having red, green, blue, purple or any other suitable color that will emit light of the characteristic color of the material when illuminated with ultraviolet radiation in the range of wavelength between about 300 nm and 400 nm may be used, either alone or in combination.

Inorganic fluorescent materials useful in the present invention include yttrium and europium or salts thereof. In a preferred embodiment, an inorganic fluorescent material is coated on the thread, so that when irradiated with ultraviolet radiation at a wavelength between about 300 nm and 400 nm, a color different from that in visible light fluoresces, such as red.

As indicated above, the textured emblem of this invention including a mark such as a trademark formed of inorganic fluorescent material-coated thread will emit light of the characteristic color (or colors) of the fluorescent material (or materials) the instant that the emblem is illuminated with ultraviolet radiation, whereby anybody can readily distinguish an imitation article from a genuine article.

It is thus to be understood that the present invention makes it possible for even distributors to easily verify identification marks, such as trademarks, put on goods returned from the market as substandard products, and lends itself to prohibiting forgery of identification marks.

From the above discussion, many variations will be apparent to one skilled in the art that would yet be encompassed by the spirit and scope of the invention.

I claim:

1. A forgery-preventing textured emblem having an identification mark of letters, figures or other indicia woven thereinto, said identification mark being made of thread having inorganic fluorescent material applied thereon, said inorganic fluorescent material selected from the group consisting of yttrium, europium and salts thereof, and said inorganic fluorescent material normally appearing in at least one particular color under a visible light, but when illuminated with ultraviolet radiation in a range of wavelength between 300 nm and 400 nm, emitting light in at least one color characteristic of said inorganic fluorescent material which is different from said at least one particular color in which said inorganic fluorescent material appears under said visible light.

* * * * *